United States Patent Office 3,652,502
Patented Mar. 28, 1972

3,652,502
LINEAR POLYESTERS HAVING FREE CARBOXYL RADICALS DISTRIBUTED ALONG THE MOLECULAR CHAIN, COATINGS THEREOF AND COATED SUBSTRATES
Winston J. Jackson, Jr., John R. Caldwell, and Herbert F. Kuhfuss, Kingsport, Tenn., assignors to Eastman Kodak Company, Rochester, N.Y.
No Drawing. Filed Aug. 5, 1970, Ser. No. 61,441
Int. Cl. C08g 17/04, 17/18, 39/02
U.S. Cl. 260—75 R
14 Claims

ABSTRACT OF THE DISCLOSURE

Carboxylated linear polyester having linear chains from polyester forming constituents including a trihydric alcohol (e.g., glycerine) having two primary hydroxyl groups and one secondary hydroxyl group, said secondary hydroxyl group being esterified with a di- or tricarboxyl-containing anhydride constituent (e.g., trimellitic anhydride) to give said carboxylated linear polyester containing from 1–15 weight percent of free carboxyl groups from said esterified anhydride constituent which are pendant from the linear chains. These linear carboxylated polyesters form coatings and promote adhesion of polymeric coating material to substrates such as metal, glass, etc., e.g., coatings for steel, coatings for electrical components, ink compositions having improved adhesion, etc.

This invention relates to novel essentially linear polyesters containing free carboxyl groups and substrates coated with compositions comprising these polyesters. More specifically, this invention relates to novel carboxylated linear polyesters prepared by reacting essentially linear polyesters containing free secondary hydroxyl groups with an organic anhydride, whereby there can be a relatively large number of free carboxyl groups distributed at intervals along the molecular chain as pendant carboxyl groups hanging onto the chain.

The coating industry has a need for primers and other coating materials with improved adhesion to both substrates and coated substrates. A superior primer or other coating must be able to meet a wide variety of specific end use requirements. Properties such as adhesion to a variety of substrates and intermediate coatings, topcoats, water resistance, toughness, durability, resistance to various salt solutions, acids and bases, storage stability and economic feasibility must be carefully evaluated in determining coating effectiveness.

The carboxylated polyesters of this invention have a high degree of effectiveness in solving this need. They provide excellent adhesion to a wide variety of materials and, accordingly, these compositions are valuable as components of prime coating compositions and as materials which may be added to other substances to form tough adherent prime coatings or subsequent coatings. Such coatings have improved adhesion to substrates such as metals, wood, plastics, ceramics, glass and the like. The carboxylated polyesters of this invention are readily soluble in a variety of common solvents and, when coated on any of a number of substrates, form durable adherent prime coatings which provide excellent adhesion for ink, paints, lacquers and the like.

Polyesters containing free carboxyl groups are known which are employed to prepare self-supporting films and fibers. These polyesters have been used for producing shaped articles having an affinity for basic type dyes. Such polyesters are described in U.S. Pat. 3,048,565. Other patents having background interest include U.S. 3,057,826, U.S. 3,213,063, U.S. 3,055,867, U.S. 2,437,232, U.S. 3,122,451 and U.S. 2,890,208.

It has been known that free carboxyl groups, which are closely associated with the main polymer chain, improve the adhesion of such a carboxylated polyester on a wide variety of coated and uncoated substrates such as wood, glass, metals, ceramics, leather, paper, cellulose esters, cellulose ethers, synthetic polymeric materials and the like. See U.S. Pat. 3,459,584.

Unexpectedly, it has now been discovered that carboxylated polyesters with free carboxyl groups present as pendant groups attached to the main polymer chain as more particularly described hereinafter, are novel and have greatly improved properties associated with adhesive utility.

According to one aspect of this invention, such a novel carboxylated polyester is obtained by reacting an essentially linear polyester, having within its main polymer chain secondary hydroxyl groups, with the anhydride of a dicarboxylic or tricarboxylic acid. In addition to the improved adhesive properties discovered, it is surprising to find that stable substantially linear carboxylated polyesters are obtained even though the polymer contains relatively large proportions of trifunctional reactants. It would normally be expected that cross-linked insoluble products would be formed.

It is an object of this invention to provide novel valuable prime coating compositions and other coating compositions for use on a wide variety of substrates.

It is another object of this invention to provide novel polyesters containing pendant (attached to Y as shown below) free carboxyl groups having excellent adhesion to a wide variety of materials and having other valuable properties associated with adhesive utility.

It is another object of this invention to provide new and useful adhesion-promoting polyesters containing pendant free carboxyl groups.

It is still another object of this invention to provide such carboxylated polyesters that have utility as a component of a priming coat for promoting adhesion on metals, wood and other substrates.

It is still another object of this invention to provide a method for preparing carboxylated polyesters containing pendant free carboxyl groups having the above characteristics and properties.

Other objects will become apparent from the description herein and the claims which follow.

According to one aspect of this invention, there is provided an essentially linear carboxylated polyester essentially free of olefinic unsaturation having linear chains consisting essentially of interconnected divalent groups having the formula:

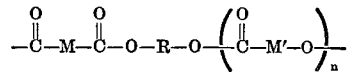

wherein n is zero or a positive integer for each divalent group, each M represents the residue of a bifunctional dicarboxylic acid having from 2 to 40 carbon atoms, each M' represents the residue of a bifunctional hydroxycarboxylic acid having from 2 to 40 carbon atoms, each R represents $R_1$, $R_2$ or $R_3$ defined as follows:

$R_1$ is the residue of a bifunctional glycol having two primary hydroxyl groups and having 2 to 120 carbon atoms, $R_2$ is the residue of a trihydric alcohol having two primary hydroxyl groups, one secondary hydroxyl group and has the formula:

wherein R' has from 3 to 10 carbon atoms, or $R_3$ is the residue of a trihydric alcohol having two primary hydroxyl groups and one substituted secondary hydroxyl group and has the formula:

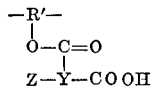

wherein Z is hydrogen or a carboxyl radical, and
Y is a radical having from 2 to 15 carbon atoms, said carboxylated polyester having a value of $n$ and containing said residues $R_3$ in an amount whereby the carboxylated polyester contains from about 1 to about 15 weight percent of free carboxyl groups, said carboxylated polyester containing the sum of said residues $R_2$ plus $R_3$ in amount from about 5 to about 50 percent based on the sum of said residue M plus said residue M', said percentage being on a mole proportional basis, said carboxylated polyester having an inherent viscosity of at least 0.10, as measured at 25° C. using 0.25 gram of polyester per 100 ml. of a solvent consisting of 60 percent by weight phenol and 40 percent by weight tetrachloroethane.

Especially preferred carboxylated polyesters are those which contain from about 3 to about 10 weight percent of free carboxyl groups and the sum of residues $R_2$ and $R_3$ are present in an amount from about 10 to about 25 percent on a mole proportional basis.

The carboxylated polyesters of this invention can be derived from a wide variety of dicarboxylic acids, glycols and hydroxy acids. Hence, it is possible to prepare carboxylated polyesters having any desired type of solubility. For example, the polymers can be soluble in polar solvents such as alcohols, nitriles, esters, ketones, amides, etc. By selecting the proper intermediates, polymers soluble in chlorinated hydrocarbons, aromatic hydrocarbons or aliphatic hydrocarbons can be advantageously made.

In an especially preferred embodiment of this invention

M is a residue of the combination of terephthalic acid and isophthalic acid,
$R_1$ is the residue from 2,2-dimethyl-1,3-propanediol,
$R_2$ is the residue from 1,2,3-propanetriol,
$R_3$ is the residue from 1,2,3-propanetriol wherein Z is a carboxyl radical, and
Y is the radical from trimellitic acid anhydride.

Certain other aspects of the foregoing objects are accomplished in accordance with this invention by providing a coated substrate in which the substrate is selected from the group consisting of metal, wood, paper, cellulose esters, cellulose ethers, and synthetic polymeric materials. The carboxylated polyester of this invention has particularly good adhesion on metals such as iron, steel, brass, aluminum and copper. The substrate is advantageously coated with a solution of a carboxylated polyester described above and the prime coated substrate is advantageously topcoated with a coating composition which is different from that of the substrate and comprises a material selected from the group consisting of cellulose esters, cellulose ethers, vinyl polymers, acrylic polymers, polyesters, polycarbonates, polyolefins, styrene polymers, polyamides, polyesteramides, polyureas, polyurethane, poly(phenyleneoxides), polysulfones, polyethers, polyacetals, and waxes. The new carboxylated polyesters of this invention can also be mixed in solution with many types of polymeric materials in order to impart improved adhesion of coatings.

A carboxylated polyester of this invention is advantageously prepared by reacting a linear polyester containing secondary hydroxyl groups with the anhydride of a dicarboxylic or tricarboxylic acid. In the first step of the preparation, a linear polyester containing secondary hydroxyl groups may be formed by the condensation of any of a wide variety of dicarboxylic acids with any of a wide variety of glycols and a trihydric alcohol that contains two primary hydroxyl groups and one secondary hydroxyl group. Alternatively, it may advantageously be prepared by the condensation of any of a wide variety of hydroxyl carboxylic acids, dicarboxylic acids, glycols and trihydric alcohols, the latter containing two primary hydroxyl groups and one secondary hydroxyl group. Carboxylated polyesters which may be employed according to this invention include those prepared by condensing two or more dicarboxylic acids, two or more glycols, or two or more hydroxy carboxylic acids in the condensation mentioned above.

The trihydric alcohol may contain 3 to 10 carbon atoms. The trihydric alcohol is reacted with the dicarboxylic acid, glycol, hydroxy carboxylic acid (when used) or esters of such acids (1–4 carbon alkyl esters) at a temperature of 200–220° C. to produce a polyester that contains secondary hydroxyl groups located at intervals along the molecular chain consisting essentially of recurring or repeating units having the formula:

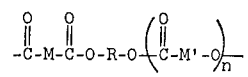

as described hereinabove wherein R is limited to $R_1$ and $R_2$. The temperature is kept sufficiently below 225° C. so as to avoid the formation of a cross-linked insoluble product. If a trihydric alcohol were used having only primary hydroxyl groups, a cross-linked insoluble product would be obtained. From about 5 to about 50 mole proportions of the defined trihydric alcohol may be used, i.e., having the formula:

When reacted under the proper conditions, the defined trihydric alcohols enter the polyester chain by esterification of the primary hydroxyl groups. The secondary hydroxyl groups remain essentially unreacted and hence the polyester is essentially linear and contains free secondary hydroxyl groups located at intervals along the chain. The nuclear magnetic resonance (NMR) spectrum of the linear polymer so produced indicates that the polyester contains the calculated amount of secondary hydroxyl groups and is, therefore, essentially linear and is substantially free of crosslinkages. This result is surprising since it would ordinarily be expected that crosslinking would occur.

The inherent viscosity of the essentially linear polymer is advantageously at least 0.10 and preferably at least 0.20. It may be much greater depending upon the particularly expected utility, e.g., 0.6, 0.8 or higher.

The dicarboxylic acids which may be employed to prepare the polyester containing free secondary hydroxyl groups can be aliphatic or aromatic such as:

(1) A saturated aliphatic dicarboxylic acid having 2–40 carbon atoms. Typical saturated aliphatic dicarboxylic acids are: malonic acid, succinic acid, glutaric acid, adipic acid, pimelic acid, suberic acid, azelaic acid, sebacic acid and any of the polymethylene dicarboxylic acids. Branched chain aliphatic dicarboxylic acids are also operable in this invention and, therefore, include compounds such as dimethylmalonic acid, methylsuccinic acid, 2,2-dimethylsuccinic acid, 2-methyladipic acid and the like. Another dicarboxylic acid for use in this invention is the dimer of a mono-olefinically unsaturated fatty acid, such as dimerized oleic acid which is a saturated dicarboxylic acid having 36 carbon atoms.

(2) An aromatic dicarboxylic acid having from 8–25 carbon atoms such as phthalic acid, terephthalic acid, isophthalic acid, 3-chloroisophthalic acid, the various naphthalene dicarboxylic acids, etc.

(3) A saturated alicyclic dicarboxylic acid having from 6–25 carbon atoms such as 1,3-cyclopentanedicarboxylic acid, 2,3-norcomphanedicarboxylic acid, 1,3-cyclohexanedicarboxylic acid, 1,4-cyclohexanedicarboxylic acid, etc.

(4) An alkoxyalkyl dicarboxylic acid having from 4–25 carbon atoms such as diglycolic acid, 3,3'-oxydipropionic acid, etc.

(5) An aryldialkanoic dicarboxylic acid having from 8–25 carbon atoms such as p-phenylenedioxyacetic acid, etc.

(6) An aryloxyaryl dicarboxylic acid having from 14–25 carbon atoms such as

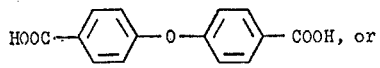

(7) A chlorine or bromine substituted dicarboxylic acid of any of the aromatic dicarboxylic acids.

The glycols which can be employed to prepare the polyester containing free secondary hydroxyl groups can be aliphatic or contain aromatic groups such as:

(1) An aliphatic glycol having from 2–40 carbon atoms such as 2,2-dimethyl-1,3-propanediol, 1,4-butanediol, 1,6-hexanediol, ethylene glycol, 2-methyl-2-butyl-1,3-propanediol, 2-methyl-1,4-butanediol, 3-methyl-1,6-hexanediol, 2-ethyl-1,5-pentanediol, the higher polymethylene glycols, etc.

(2) An alicyclic glycol having from 6–15 carbon atoms such as 1,2-cyclohexanedimethanol, 1,3-cyclohexanedimethanol, 1,4-cyclohexanedimethanol, etc.

(3) An aromatic glycol having from 8–15 carbon atoms such as o-, m-, and p-xylylene glycol, etc.

(4) A dialkoxyaryl glycol having from 8–20 carbon atoms such as p-phenylenedioxydiethanol, etc.

(5) A dialkoxyalkyl glycol having from 4–30 carbon atoms such as 4,4'-dihydroxydibutyl ether, etc. and (6) A poly(alkyleneoxy) glycol wherein each alkylene has 2 to 4 carbon atoms and the glycol contains up to about 120 carbon atoms such as:

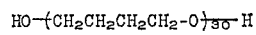

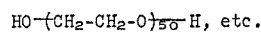

The hydroxy carboxylic acids which may be employed to prepare the polyester containing free secondary hydroxyl groups can also be aromatic or aliphatic such as an aliphatic hydroxycarboxylic acid having from 2–10 carbon atoms. Typical of such compounds are glycolic acid, lactic acid, hydroxypivalic acid, 6-hydroxyhexanoic acid, and 4-hydroxymethylcyclohexanecarboxylic acid and the like. Typical aromatic hydroxy carboxylic acids include 4-hydroxybenzoic acid,

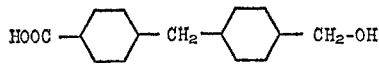

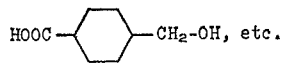

An alkyl ester of any of these acids may be utilized wherein the alkyl group contains from 1 to 4 carbon atoms. A chlorine or bromine substituted aromatic dicarboxylic or hydroxycarboxylic acid may also be advantageously employed.

As mentioned above, the polyester containing the free secondary hydroxyl groups are advantageously made by employing as a reactant a trihydric alcohol having 3 to 10 carbon atoms that contains two primary hydroxyl groups and one secondary hydroxyl group. Typical trihydric alcohols include 1,2,3-propanetriol, 1,2,6-hexanetriol and 2-hydroxyl 1,4-cyclohexane, dimethanol, etc. The polyesters as described above have an inherent viscosity of at least 0.10 and preferably at least 0.20 but may be as high as 0.6, 0.8 or higher.

In the second step of the preparation, the free secondary hydroxyl groups of a linear polyester described above is reacted with the anhydride of a dicarboxylic or tricarboxylic acid. This reaction is advantageously carried out in an inert atmosphere at a temperature of from about 175° C. to about 195° C. to produce a carboxylated essentially linear polyester. At temperatures above 200° C. an undesirable cross-linked insoluble product would usually be obtained.

Acid number determination is used to confirm that the calculated number of free carboxyl groups are present in the polyester. The acid number is calculated by determining the number of milligrams of potassium hydroxide required to neutralize a one gram sample of the polyester.

The solubility of the carboxylated polyesters in various solvents indicate that there is essentially no cross-linkage. This is further evidenced by the fact that the inherent viscosity of the carboxylated polyester is essentially the same as the polyester obtained in the first step of the preparation. At room temperature the carboxylated polyester is generally a clear brittle solid. The reaction may require as little as a few minutes to as much as a few hours to reach completion, depending upon the temperature and the nature of the reactants.

To avoid cross-linking of the polymer by esterification of the carboxyl groups, the amount of dicarboxylic or tricarboxylic anhydride which is advantageously employed is preferably no less than about 1 mole of anhydride per mole of trihydric alcohol employed in making the polyester containing free secondary hydroxyl groups, although the proportions may range from about one half mole to 1 mole of anhydride per mole of trihydric alcohol. Especially when less than 1 mole proportion of anhydride is added so that some of the secondary hydroxyl groups are left unreacted, the reaction time and temperature is advantageously minimized, e.g., 30 minutes at about 175° C. so as to avoid cross-linking the polymer by interesterification of pendant free carboxyl groups with unreacted secondary hydroxyl groups.

The dicarboxylic or tricarboxylic acid anhydrides, which may be employed to prepare the compositions of this invention, can be represented by the formula

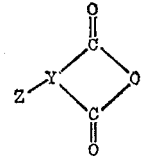

wherein Z is hydrogen or a carboxyl radical, and Y is a radical having from 2 to 15 carbon atoms. These anhydrides include compounds such as trimellitic acid anhydride, 1,2,3-benzenetricarboxylic acid anhydride, 1,2,5-naphthalenetricarboxylic acid anhydride, 1,2,4-cyclohexanetricarboxylic acid anhydride, 2-carboxyadipic acid anhydride, phthalic acid anhydride, 3-chlorophthalic acid anhydride, naphthalic acid anhydride, succinic acid anhydride, 2-methylsuccinic acid anhydride, glutaric acid anhydride, or 1,2-cyclohexanedicarboxylic acid anhydride, a combination of these, etc.

According to a preferred embodiment of this invention,

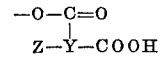

is the residue of a dicarboxylic acid and Z is carboxyl. According to an especially preferred embodiment of this invention, the dicarboxylic acid anhydride employed is trimellitic anhydride.

The process of the present invention as it relates to making carboxylated polyesters is generally well known, as illustrated by U.S. 3,048,565 and other patents mentioned above, except for the surprising facts that (1) The polyester containing $R_2$ residues is essentially linear, and (2) The carboxylated polyester containing $R_3$ residues is also essentially linear.

Further details as to the process conditions are obvious from the prior art except for these unexpected aspects which are explained hereinabove and illustrated in the working examples hereinbelow.

According to a preferred aspect of this invention, there is provided a process for making a carboxylated polyester as defined above comprising heating for from about 0.25 to about 2.5 hours in an inert atmosphere at a temperature of 175° C.–200° C., an essentially linear hydroxyl-containing polyester consisting essentially of interconnected divalent groups having the formula:

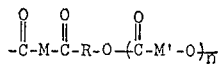

with an anhydride of a dicarboxylic or tricarboxylic acid, said anhydride having the formula:

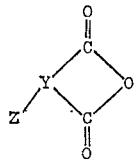

wherein M, M', R, Y, Z and $n$ are the same as defined in claim 1.

The substrates which are prime coated by the composition of this invention include a wide variety of materials such as metal, wood, paper, cellulose ethers, cellulose esters, and many synthetic polymeric materials. Any of the metals which are commonly used in the construction of buildings, molded articles and the like may be prime coated by a composition comprising a carboxylated polyester of this invention. Illustrative of such metals are iron, steel, brass, aluminum, bronze, zinc, nickel, chromium, magnesium, lead, copper, titanium, gold, silver, and the alloys of such metals. Among the resinous or plastic materials which can be prime coated by a composition of this invention are cellulose esters, cellulose ethers, vinyl polymers, acrylic polymers, polyesters, polycarbonates, polyolefins, styrene polymers, polyamides, polyesteramides, polyureas, polyurethanes, poly(phenyleneoxides), polysulfones, polyethers, polyacetals, and waxes of various types. Of course, in addition to these materials other commonly used substrates may be employed with the prime coating compositions of this invention such as wood, paper, textile fabrics, glass, concrete, ceramic materials, and the like.

A prime or other type coating composition of this invention is advantageously prepared by dissolving the carboxylated polyester described previously in any of a variety of solvents at a suitable concentration. Among the suitable solvents are the halogenated hydrocarbons such as perchloroethylene, chloroform, etc., alkanoyl nitriles such as acetonitrile, ketones such as methyl ethyl ketone, alkyl alkanoate esters such as butyl acetate, mixtures of aromatic hydrocarbons, e.g., toluene and aliphatic alcohols, e.g., ethanol, and blends of these various materials. The concentration of the carboxylated polyester in the solution may be any convenient amount depending upon the type of coating to be applied and upon the method of applying that coating. If the solution is to be spread on a substrate, a higher viscosity of solution and therefore a higher concentration of carboxylated polyester may be employed. If on the other hand, the solution is to be sprayed on the substrate, it may be desirable to employ a lower concentration in the solution so as to obtain a lower viscosity. In general, the range of concentrations will vary from about 2 percent to about 20 percent by weight of the total solution with the preferred concentration varying from about 5 percent to about 15 percent.

Substrates prime coated or otherwise coated with the composition of this invention are particularly receptive to a wide variety of adjacent coats, e.g., topcoats. These may be applied by well-known methods of spraying, painting, spreading and the like from solutions of the topcoating material or alternatively the topcoating material may be applied as a molten composition, as particles from a fluidized bed, or by other methods in which there is no solvent present. Illustrative of polymeric materials which may be employed as a coating material in the composition are the cellulose esters such as cellulose acetate, cellulose triacetate, cellulose propionate, cellulose acetate butyrate, cellulose caprate, cellulose nitrate, etc.; cellulose ethers such as ethyl cellulose, benzyl cellulose, methyl cellulose, etc.; vinyl polymers such as the homopolymers and copolymers of vinyl acetate, vinyl chloride, vinylidene chloride, vinyl ethers, vinyl acetals, vinyl fluorides, vinyl alcohol, etc.; acrylic polymers such as the homopolymers and copolymers of the alkyl, cycloalkyl, and aryl (e.g., phenyl) esters of acrylic and methacrylic acids, the amides and N-substituted amides of acrylic and methacrylic acids, and the nitriles of acrylic and methacrylic acids; polyesters capable of forming shaped articles such as those made from the condensation of dicarboxylic acids, e.g., terephthalic acid and glycols, e.g., ethylene or tetramethylene glycol, the self-condensation of hydroxy acids, the condensation of bisphenols with dicarboxylic acids, and the condensation of bisphenols with disulphonic acids; polycarbonates; polyolefins such as polyethylene, polypropylene, polybutylene, polyisobutylene, poly(2-methyl-4-pentene), poly(vinylcyclohexane), poly(allylbenzene), etc. and copolymers of such olefins with other ethylenically unsaturated materials; styrene polymers such as polystyrene, poly(alphamethylstyrene), polychlorostyrene, etc.; polyamides; polyesteramides; polyureas; polyurethanes; poly (phenylene oxides); polysulfones; polyethers; polyacetals; and waxes, such as petroleum waxes, paraffin waxes, microcrystalline waxes, degraded or oxidized polyethylene, maleated polyethylene, beeswax, carnuba wax, and the like. It is to be understood that the foregoing list of materials is merely illustrative of those which might be employed as coatings adjacent to coatings comprising the carboxylated polyesters of this invention. With few exceptions, substantially any resinous or polymeric composition will adhere to a prime coating or any other adjacent coating composition of this invention.

This invention may be more fully understood by reference to the following illustrative examples which are intended to describe certain embodiments of this invention. Parts and percentages are by weight and temperatures are in degrees centigrade unless otherwise specified.

All inherent viscosities (I.V.) are determined at 25° C. using 0.25 gram of polyester per 100 ml. of a solvent consisting of 60 percent by weight phenol and 40 percent by weight tetrachloroethane.

The adhesion of the primer or adjacent coatings is determined by the conventional "Cellophane Tape Adhesion Test" in which a cross-hatched pattern is scored at about ¼-inch intervals in the coating. A strip of cellophane is then applied with moderate finger pressure across the area after which the tape is removed by grasping it and pulling it rapidly and evenly from the surface. If any trace of the coating is removed by adhering to the tape after several repeated tests on the same scored area, the coating is considered to have failed the test. The susbtrates used in the "Cellophane Tape Adhesion Test" are prepared by being washed with an aqueous detergent solution, rinsed with water, rinsed with acetone, and dried before being coated. Before testing, the coatings are dried for 2 hours at room temperature, or if necessary, for 2 hours in an oven at 110° C.

EXAMPLE 1

A mixture of 24.25 g. (0.125 mole) dimethyl terephthalate, 20.7 g. (0.125 mole) isophthalic acid, 5.02 g. (0.0375 mole) 1,2,6-hexanetriol (15 mole percent based on the mole proportion of acid constituents which is essentially the same as the mole proportion based on the sum of the triol and diol in the polymer produced as a result of distilling off excess diol), 39 g. (0.375 mole) 2,2-dimethyl-1,3-propanediol, and 50 mg. titanium tetraisopropoxide catalyst is placed in a 250 ml. flask equipped with a stirrer, a short distillation column and an inlet for nitrogen. The mixture is stirred at 200–220° C. in a nitrogen atmosphere until the ester interchange is completed (2 hr.). A vacuum of 0.5 mm. is then applied at 220° C., and stirring is continued for 2 hr. A clear, slightly viscous melt is obtained. The polymer has an I.V. of 0.36. The nuclear magnetic resonance (NMR) spectrum shows that the polymer contains 14 mole percent 1,2,6-hexanetriol. The polymer is soluble in chloroform, butyl acetate, methyl ethyl ketone, or a 90/10 mixture by weight of toluene methanol.

Twenty grams of the above copolyester and 1.88 g. of phthalic anhydride are stirred in a nitrogen atmosphere at 175° C. for 2 hr. At room temperature, the polyester is a clear, brittle solid and has an acid number of 32.5 (calculated value 32.4). The acid number corresponds to a carboxyl content of 2.6 percent. The polymer has an I.V. of 0.36.

The carboxylated polyester is soluble in chloroform, 90/10 toluene/methanol, methyl ethyl ketone, butyl acetate, and other lacquer solvents. It is effective as a primer and in blends in improving the adhesion of cellulose acetate butyrate, poly(vinyl chloride) copolymers, poly(methyl methacrylate), polystyrene, and bisphenol A polycarbonate on aluminum, brass, copper, steel, glass, and on nylon 66 molded articles.

EXAMPLE 2

Using the procedure described in Example 1, a copolyester is made having the composition 0.5 mole terephthalic acid, 0.5 mole isophthalic acid, 0.15 mole 1,2,4-butanetriol, and 0.85 mole 2,2-dimethyl-1,3-propanediol. The polymer has an I.V. of 0.24. NMR analysis shows the presence of 15 mole percent triol. The polymer is soluble in the same solvents used in Example 1.

Twenty grams of the polyester and 1.88 grams phthalic anhydride are stirred in a nitrogen atmosphere at 175° C. for 2 hr. The appearance and properties of the resulting carboxylated polyester are generally similar to those described in Example 1.

EXAMPLE 3

Using the procedure described in Example 1, a polyester is made having the composition 0.5 mole terephthalic acid, 0.5 mole isophthalic acid, 0.15 mole 1,2,3-propanetriol, and 0.85 mole 2,2-dimethyl-1,3-propanediol. The polyester has an I.V. of 0.26 and properties similar to those described in Example 1.

Twenty grams of the polyester and 2.42 g. (15 mole percent) trimellitic anhydride are stirred in a nitrogen atmosphere at 175° C. for 2 hr. The polymer has an I.V. of 0.25 and an acid number of 64.5 (calculated value 63). The acid number corresponds to a carboxyl content of 5.2 percent. The polymer is soluble in butyl acetate, methyl ethyl ketone, 90/10 toluene/methanol, and chloroform. The polyester has excellent adhesion when coated on aluminum, steel, copper, brass and wood. Topcoats of cellulose esters, acrylate resins, vinyl resins, and polyesters show excellent adhesion on the carboxylated polyester primer.

Cellulose acetate butyrate blends with 1 percent of this carboxylated polyester pass the above-described cellophane tape test on copper, steel, and aluminum after drying at 23° C. for 2 hr. (methyl ethyl ketone solvent), whereas coatings of cellulose acetate butyrate alone (also using methyl ethyl ketone solvent) fail the test. The carboxylated polyester (5 weight percent) also improves the adhesion of coatings from chloroform of bisphenol polycarbonates, poly(methylmethacrylate), poly(vinyl chloride) and polystyrene on copper, steel, brass, and aluminum.

Example A for comparison

This example shows that a cross-linked insoluble product is obtained if 5 mole percent of a triol is used that contains only primary hydroxyl groups.

A mixture of 24.25 g. (0.125 mole) of dimethyl terephthalate, 24.25 g. (0.125 mole) of dimethyl isophthalate, 1.68 g. (0.0125 mole which is 5 mole percent on the basis described above) of 2-hydroxymethyl-2-ethyl-1,3-propanediol, 39.0 g. (0.375 mole) of 2,2-dimethyl-1,3-propanediol, and 50 mg. titanium tetraisopropoxide catalyst is placed in a 250 ml. flask equipped with a stirrer, a short distillation column and an inlet for nitrogen. The mixture is stirred at 200–220° C. in a nitrogen atmosphere until the ester interchange is completed (2 hr.). A vacuum of 0.5 mm. is then applied at 220° C., and stirring is continued for 2 hr. A clear, immobile gel is obtained, which is insoluble in chloroform and other common solvents.

Example B for comparison

This example shows that a cross-linked polymer is obtained if trimellitic anhydride is added at the beginning of the reaction.

A mixture of 9.7 g. (0.05 mole) of dimethyl terephthalate, 9.7 g. (0.05 mole) of dimethyl isophthalate, 1.4 g. (0.015 mole, which is 15 mole percent on basis described above) of 1,2,3-propanetriol, 2.9 g. (0.015 mole) of trimellitic anhydride, 15.6 g. (0.15 mole) of 2,2-dimethyl-1,3-propanediol, and 20 mg. titanium tetraisopropoxide catalyst is placed in a 100 ml. flask equipped with a stirrer, a short distillation column and an inlet for nitrogen. The mixture is stirred at 200–220° C. in a nitrogen atmosphere until the ester interchange is completed (2 hr.). A vacuum of 0.5 mm. is then applied at 220° C., and stirring is continued for 1 hr. A clear, immobile gel is obtained which is insoluble chloroform and other common solvents.

EXAMPLE 4

Example 3 is repeated, except 5 mole percent 1,2,3-propanetriol and 5 mole percent trimellitic anhydride are used instead of 15 mole percent. The carboxylated polyester has an acid number of 21.5, which corresponds to a carboxyl content of 1.7 percent. The polyester has improved adhesion properties on the substrates in Example 3. The use of 3 weight percent is advantageous in cellulose acetate butyrate to impart satisfactory adhesion of coatings on steel and aluminum.

EXAMPLE 5

Example 3 is repeated, except 25 mole percent of 1,2,3-propanetriol and 25 mole percent of trimellitic anhydride are used instead of 15 mole percent. The polyester has an I.V. of 0.15, a carboxyl content of 8.5 percent and properties that are generally similar to those described in Example 3.

EXAMPLE 6

Example 5 is repeated using 25 mole percent of 1,2,3-propanetriol but only 12.5 mole percent of trimellitic anhydride. The reaction time with the anhydride at 175° C. is limited to 30 minutes. The polyester has an I.V. of 0.22, a carboxyl content of 4.3 percent and properties that are generally similar to those described in Example 3.

When the reaction time with the anhydride is 2 hr. as in Example 5, instead of 30 minutes, a cross-linked gel is obtained.

EXAMPLE 7

Example 3 is repeated, except 50 mole percent of 1,2,3-propanetriol and 50 mole percent of phthalic anhydride are used. The polyester has an I.V. of 0.14, a carboxyl content of 8.6 percent, and properties that are generally similar to those described in Example 3.

EXAMPLES 8, 9, 10 AND 11

Example 3 is repeated, except that 15 mole percent of the following anhydrides are used in place of the trimellitic anhydride:

Example 8:
1,2-cyclohexanedicarboxylic anhydride
Example 9:
Succinic anhydride
Example 10:
2-carboxyadipic anhydride
Example 11:
1,2,5-naphthalenetricarboxylic anhydrides.

The carboxylated polyesters of Examples 8–11 have properties that are generally similar to those described in Example 3.

EXAMPLES 12–23

Polyesters are made having the following compositions:

Example 12

1.0 mole 50/50 cis/trans-hexahydroterephthalic acid, 0.15 mole 1,2,3-propanetriol, 0.50 mole 2,2-dimethyl-1,3-propanediol, and 0.35 mole ethylene glycol.

Example 13

0.6 mole terephthalic acid, 0.4 mole 50/50 cis/trans-hexahydroterephthalic acid, 0.10 mole, 1,2,4-butanetriol, and 0.9 mole 2,2-dimethyl-1,3-propanediol.

Example 14

0.7 mole 50/50 cis/trans-hexahydroterephthalic acid, 0.3 mole chloroterephthalic acid, 0.15 mole 1,2,3-propanetriol, and 0.85 mole 1,4-butanediol.

Example 15

0.7 mole 50/50 cis/trans-hexahydroterephthalic acid, 0.30 mole isophthalic acid, 0.10 mole 1,2,6-hexanetriol, and 0.9 mole 1,4-butanediol.

Example 16

0.5 mole isophthalic acid, 0.5 mole adipic acid, 0.1 mole 1,2,3-propanetriol, and 0.9 mole 30/70 cis/trans-1,4-cyclohexanedimethanol.

Example 17

1.0 mole 2,6-naphthalenedicarboxylic acid, 0.20 mole 1,2,6 - hexanetriol, and 0.70 mole 2-methyl-2-butyl-1,3-propanediol, and 0.10 mole of a glycol derived from the dimerized oleic acid containing 36 carbon atoms.

Example 18

0.6 mole 4,4'-methylenedibenzoic acid, 0.4 mole succinic acid, 0.10 mole 1,2,3-propanetriol, 0.80 mole diethylene glycol, and 0.10 mole of a polyethylene glycol containing 30 carbon atoms.

Example 19

1.0 mole trans-1,4-cyclohexanedicarboxylic acid, 0.15 mole 1,3,5-pentanetriol, 0.35 mole p-xylylene glycol, and 0.50 mole of p,p'-isopropylidenedi(2-phenoxyethanol).

Example 20

0.7 mole 6-hydroxyhexanoic acid, 0.3 mole adipic acid, 0.15 mole 1,2,3-propanetriol, and 0.15 mole p-phenyleneoxydiethanol.

Example 21

0.8 mole 4-hydroxymethylcyclohexanecarboxylic acid, 0.2 mole azelaic acid, and 0.20 mole 1,2,4-butanetriol.

Example 22

0.6 mole 4-hydroxymethylbenzoic acid, 0.4 mole adipic acid, 0.2 mole 1,2,6-hexanetriol, and 0.2 mole 1,6-hexanediol.

Example 23

0.7 mole p-hydroxyethoxybenzoic acid, 0.2 mole sebacic acid, 0.1 mole of the dimer of oleic acid containing 36 carbon atoms, and 0.3 mole 1,2,3-propanetriol.

The polyesters of Examples 12–23 are reacted with trimellitic dianhydride (same molar amount as triol). The resulting carboxylated polyesters are effective as primers and in blends in improving the adhesion of cellulose acetate butyrate, poly(vinyl chloride), poly(methyl methacrylate), and poly-styrene on aluminum, brass, copper and steel.

Although the invention has been described in considerable detail with reference to certain preferred embodiments thereof, it will be understood that variations and modifications can be effected without departing from the spirit and scope of the invention.

We claim:

1. An essentially linear carboxylated polyester essentially free of olefinic unsaturation having linear chains consisting essentially of interconnected divalent groups having the formula:

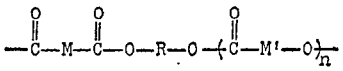

wherein $n$ is zero or a positive integer for each divalent group, each M represents the residue of a bifunctional dicarboxylic acid having from 2 to 40 carbon atoms, each M' represents the residue of a bifunctional hydroxycarboxylic acid having from 2 to 40 carbon atoms, each R represents $R_1$, $R_2$ or $R_3$ defined as follows:

$R_1$ is the residue of a bifunctional glycol having two primary hydroxyl groups and having 2 to 120 carbon atoms, $R_2$ is the residue of a trihydric alcohol having two primary hydroxyl groups, one secondary hydroxyl group and has the formula:

wherein R' has from 3 to 10 carbon atoms, or $R_3$ is the residue of a trihydric alcohol having two primary hydroxyl groups and one substituted secondary hydroxyl group and has the formula:

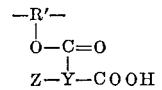

wherein Z is hydrogen or a carboxyl radical, and Y is a radical having from 2 to 15 carbon atoms, said carboxylated polyester containing said residues $R_3$ in an amount whereby the carboxylated polyester contains from about 1 to about 15 weight percent of free carboxyl groups, said carboxylated polyester containing the sum of said residues $R_2$ plus $R_3$ in amount from about 5 to about 50 percent based on the sum of said residue M plus said residue M', said percentage being on a mole proportional basis, said carboxylated polyester having an inherent viscosity of at least 0.10, as measured at 25° C. using 0.25 grams of polyester per 100 ml. of a solvent consisting of 60 percent by weight phenol and 40 percent by weight tetrachloroethane.

2. A polyester according to claim 1 wherein Z is a carboxyl radical.

3. A polyester according to claim 1 which contains from about 3 to about 10 weight percent of free carboxyl groups.

4. A polyester according to claim 1 containing the sum of said residues of $R_2$ and $R_3$ in an amount from about 10 to about 25 percent.

5. A polyester according to claim 1,
M being the residue of
(1) a saturated aliphatic dicarboxylic acid having 2–40 carbon atoms,
(2) an aromatic dicarboxylic acid having from 8–25 carbon atoms,
(3) a saturated alicyclic dicarboxylic acid having from 6–25 carbon atoms,
(4) an alkoxyalkyl dicarboxylic acid having from 4–25 carbon atoms,
(5) an aryloxyaryl dicarboxylic acid having from 14–25 carbon atoms,
(6) an aryldialkanoic dicarboxylic acid having from 8–25 carbon atoms, or
(7) a chlorine or bromine substituted dicarboxylic acid of the aromatic dicarboxylic acids, $R_1$ being the residue of
(1) an aliphatic glycol having from 2–40 carbon atoms,
(2) an aromatic glycol having from 8–15 carbon atoms,
(3) an alicyclic glycol having from 6–15 carbon atoms,
(4) a poly(alkyleneoxy) glycol wherein each alkylene has 2 to 4 carbon atoms and the glycol contains up to about 120 carbon atoms,
(5) a dialkoxyaryl glycol having from 8–20 carbon atoms, or
(6) a dialkoxyalkyl glycol having from 4–30 carbon atoms.

M' being the residue of
(1) an aliphatic hydroxycarboxylic acid having from 2–10 carbon atoms,
(2) an aromatic hydroxycarboxylic acid having from 7–25 carbon atoms, or
(3) a chlorine or bromine substituted aromatic hydroxycarboxylic acid.

6. A polyester according to claim 1
M being the residue of
(1) terephthalic acid,
(2) isophthalic acid,
(3) cis-hexahydroterephthalic acid,
(4) adipic acid,
(5) 2,6-naphthalenedicarboxylic acid,
(6) succinic acid,
(7) azelaic acid, or
(8) 4,4'-methylenedibenzoic acid, or
(9) a combination of these, $R_1$ being the residue of
(1) 2,2-dimethyl-1,3-propanediol,
(2) 1,4-butanediol,
(3) trans-1,4-cyclohexanedimethanol,
(4) cis-1,4-cyclohexanedimethanol,
(5) diethylene glycol,
(6) p-xylenediol,
(7) 1,6-hexanediol,
(8) ethylene glycol, or
(9) 2-methyl-2-butyl-1,3-propanediol, or
(10) a combination of these, M' being the residue of
(1) 4-hydroxymethylcyclohexanecarboxylic acid,
(2) 6-hydroxyhexanoic acid,
(3) glycolic acid,
(4) hydroxypivalic acid, or
(5) lactic acid, or
(6) a combination of these, $R_2$ being the residue of
(1) 1,2,3-propanetriol,
(2) 1,2,6-hexanetriol,
(3) 1,2,4-butanetriol,
(4) 1,3,5-pentanetriol, or
(5) 2-hydroxy-1,4-cyclohexanedimethanol, or
(6) a combination of these, $R_3$ being the residue of
(1) 1,2,3-propanetriol,
(2) 1,2,6-hexanetriol,
(3) 1,2,4-butanetriol,
(4) 1,3,5-pentanetriol, or
(5) 2-hydroxy-1,4-cyclohexanedimethanol, or
(6) a combination of these, and Y being the radical from the anhydride of:
(1) trimellitic acid,
(2) 1,2,3-benzenetricarboxylic acid,
(3) 1,2,5-naphthalenetricarboxylic acid,
(4) 1,2,4-cyclohexanetricarboxylic acid,
(5) 2-carboxyadipic acid,
(6) phthalic acid,
(7) 3-chlorophthalic acid,
(8) naphthalic acid,
(9) succinic acid,
(10) 2-methylsuccinic acid,
(11) glutaric acid, or
(12) 1,2-cyclohexane dicarboxylic acid, or
(13) a combination of these.

7. A polyester according to claim 6
M being the residue of the combination of terephthalic acid and isophthalic acid,
$R_1$ being the residue of 2,2-dimethyl-1,3-propanediol,
$R_2$ being the residue from 1,2,3-propanetriol,
$R_3$ being the residue from 1,2,3-propanetriol wherein Z is a carboxyl radical and
Y is the radical from trimellitic acid anhydride.

8. A polyester according to claim 7 wherein
M is about 50 mole proportions of the residue of terephthalic acid and about 50 mole proportions of the residue of isophthalic acid,
$R_1$ is about 85 mole proportions,
$R_2$ is less than 1 mole proportion,
$R_3$ is about 15 mole proportions.

9. A polyester according to claim 6
M being the residue of terephthalic acid and isophthalic acid,
$R_1$ being the residue of 2,2-dimethyl-1,3-propanediol,
$R_2$ being the residue of 1,2,3-propanetriol,
$R_3$ being the residue of 1,2,3-propanetriol wherein Z is a carboxyl radical and
Y is the radical from 2-carboxy adipic acid anhydride.

10. A polyester according to claim 6
M being the residue of cis-hexahydroterephthalic acid and trans-hexahydroterephthalic acid,
$R_1$ being the residues of 2,2-dimethyl-1,3-propanediol and ethylene glycol,
$R_2$ being the residue of 1,2,3-propanetriol,
$R_3$ being the residue of 1,2,3-propanetriol wherein Z is a carboxyl group and
Y is the radical from trimellitic acid anhydride.

11. A coating composition comprising a solution of a polyester defined by claim 1.

12. The composition of claim 11 containing a polymeric coating material having improved adhesion to a coated substrate.

13. A process for the manufacture of a polyester according to claim 1 comprising heating for from about 0.25 to about 2.5 hours in an inert atmosphere at a temperature of 175° C.–200° C. an essentially linear hydroxyl-containing polyester consisting essentially of interconnected divalent groups having the formula:

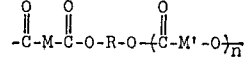

wherein R represents $R_1$ and $R_2$ as defined above, with an anhydride of a dicarboxylic or tricarboxylic acid, said anhydride having the formula

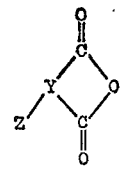

wherein M, M', Y, Z and $n$ are the same as defined in claim 1.

14. The process of claim 13 wherein Z is a carboxyl radical.

References Cited

UNITED STATES PATENTS 2,887,468  5/1959  Caldwell et al.
3,288,759  11/1966  Holub et al.

OTHER REFERENCES

Koslova et al., Plast. Massy 1969(4), 19–21.
Shim et al., Kogyo Kagaku Zasshi 68, 387–92 (1965).

MELVIN GOLDSTEIN, Primary Examiner

U.S. Cl. X.R.

117—72, 73, 74, 75, 132 C, 138.8 A, 145, 148, 155 R;
260—31.2 XA, 32.8 R, 33.4 R, 33.8 R, 47 C, 75 T, 76